United States Patent
Bauer et al.

[15] 3,703,912
[45] Nov. 28, 1972

[54] PLATE VALVE
[72] Inventors: Friedrich Bauer, Vienna, Austria; Robert Kohler, Schongau/Lech, Germany
[73] Assignee: Hoerbiger Ventilwerke Aktiengesellschaft, Vienna, Austria
[22] Filed: Feb. 17, 1971
[21] Appl. No.: 116,149

[30] Foreign Application Priority Data
Feb. 18, 1972 Austria .................. A 1449/70

[52] U.S. Cl. .............. 137/514, 137/516.13, 137/529
[51] Int. Cl. ............................................. F16k 15/08
[58] Field of Search ........... 137/514, 516.13, 516.11, 516.15, 137/516.17, 516.21, 516.23, 529

[56] References Cited
UNITED STATES PATENTS

| | | |
|---|---|---|
| 1,316,184 | 9/1919 | Prellwitz .............. 137/516.13 |
| 3,177,893 | 4/1965 | King ...................... 137/514 X |
| 2,870,783 | 1/1959 | Kehler .................. 137/516.13 |
| 3,369,563 | 2/1968 | Deminger .................. 137/514 |
| 2,390,527 | 12/1945 | Flint ...................... 137/514 X |
| 3,265,085 | 8/1966 | Koehler ............ 137/516.13 X |

Primary Examiner—Robert G. Nilson
Attorney—Watson, Cole, Grindle & Watson

[57] ABSTRACT

A plate valve especially adapted for use in reciprocating compressors and comprising a valve seat, a valve guard spaced from the valve seat, a valve plate serving as a closing member, and a damping plate interposed between the valve plate and the valve guard.

6 Claims, 3 Drawing Figures

PATENTED NOV 28 1972

3,703,912

Inventors
Friedrich Bauer
Robert Kohler
By Watson, Cole, Grindle & Watson

PLATE VALVE

The invention relates to a plate valve particularly for reciprocating compressors, the plate valve being of the kind having a valve seat and a valve guard between which a spring loaded valve plate covering the flow passages in the valve seat and at least one damping plate, are arranged, the valve plate consisting of concentric rings connected by radial webs.

In plate valves, as is well known, the plates interposed between the valve seat and the valve guard move with the compressor cycle and impinge upon the valve guard and valve seat at relatively high speeds, thus subjecting them to high stresses. Moreover, the highest stresses in the valve plate occur when the plate does not impinge upon the stroke-limiting surfaces with its entire surface at the same time, but tumbles and impinges upon the valve guard or valve seat with its outer edge first. Because of these edge impacts, the outer ring of the valve plate is exposed to the greatest danger of breaking. For damping the opening impacts of the valve plate, damping plates are already known which are arranged between the valve seat and the valve guard to cushion the impacts of the valve plate during opening of the valve. But even with damping plates the desired result cannot always be achieved. For example in reciprocating compressors with oil lubrication, a film of oil is formed on the plates. Although on the one hand this results in an additional damping effect, it leads on the other hand to an undesirable adherance of the plates to each other. Consequently, the closing process of the valve plate is retarded resulting in increased impact stresses during closure of the valve. In addition, the retarded closure of the valves decreases the output of the compressor.

The present invention provides a plate valve including a valve seat, a valve guard, and a spring loaded valve plate consisting of an outer ring and an inner ring or rings, the rings being connected by radial webs and the valve plate being interposed between the valve seat and the valve guard wherein at least one damping plate is provided between the valve plate and the valve guard, the outer diameter of the or each damping plate being smaller than the outer diameter of the valve plate and a radially outer zone of the damping plate being positioned over the or one of the inner rings of the valve plate.

The valve plate may have a plurality of inner rings and the damping plate has radial zones over each said inner ring.

In this realization the impact load during the opening movement of the valve plate is substantially absorbed by the inner rings of the same, which impinges upon the damping plate, thus the outer ring of the valve plate can swing out freely, and is consequently subjected to less stress. In addition, the effect of adhesion is reduced, as the outer ring of the valve plate is not in contact with the damping plate, and the effective contact surface is reduced respectively, whereby the valve plate is furthermore subjected to less stress during the closing movement.

Spring means for the valve plate, such as coil springs or the spring arms of a spring plate, may be positioned radially outwardly of the outer periphery of the damping plate. Recesses in the damping plate for the springs thereby becoming unnecessary which simplifies the manufacture of the damping plate.

The damping plate may be slightly dish-shaped. Separate damping springs may then not be required. Preferably, two dish-shaped damping plates in opposite directions may be used.

The invention is now described, by way of example, with reference to the accompanying drawings showing cross-sectional views of three embodiments of the invention.

Figure 1:
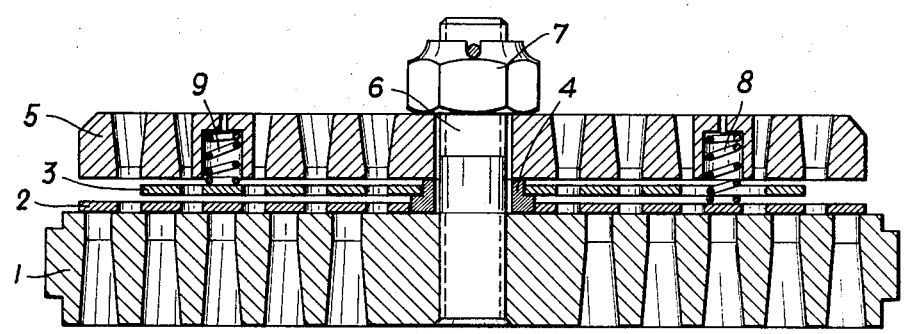
FIG. 1 shows a plate valve according to one embodiment of the invention.

Referring to FIG. 1, the plate valve according to the invention consists of a valve seat 1, with a valve plate 2, and a damping plate 3 disposed above. Both plates are held in a centered position by a guide ring 4, which is stepped in order to support the damping plate 3 spaced from the valve plate 2 when the valve is closed. Above the damping plate 3, a valve guard 5 is provided which limits the stroke of the plates during the opening movement. The individual parts of the valve are clamped together by a central screw 6 with a nut 7. The load spring for the valve plate 2 consists in this embodiment of coil springs 8 which are supported in the valve guard 5 in a spring seat and in the known manner act upon the valve plate 2 through recesses in the damping plate 3. In addition further spring seats are provided in valve guard 5 for damping springs 9 supporting the damping plate 3 spaced from the valve guard 5.

As can be seen from the drawing, the damping plate 3 has a smaller diameter than the valve plate 2. The outermost ring of the damping plate 3 is positioned above the second ring of the valve plate 2. Therefore, during the opening movement of the valve plate 2, not the outer margin of the outermost ring, but the second ring of the valve plate 2 impinges on the damping plate 3. Thereby the outer edge of the valve plate 2, which according to experience is mostly exposed to the danger of breaking, is not subjected to excessive impact stresses, whilst the opening impacts of the valve plate are nevertheless intercepted to a substantially undiminished degree by the damping plate 3. In addition, the adhesiveness occurring in lubricated valves by the presence of an oil film between the plates is diminished, as there is no outer ring for the damping plate 3 and the area of contact between the valve plate 2 and the damping plate 3 is correspondingly smaller. Moreover, in the opened valve the outermost ring of the valve plate 2 is spaced from the valve guard 5 by a distance determined by the thickness of the damping plate 3, whereby a gap is formed between the valve guard 5 and the outer ring of the valve plate 2. Medium flowing back through the flow channels in the valve guard 5 penetrates into this gap providing an additional closing force on the valve plate 2 such, that the valve plate 2, even with high deposition of oil on the plates, is loosened from the valve guard and the damping plate 3 and faster closing of the valve is facilitated.

Figure 2:
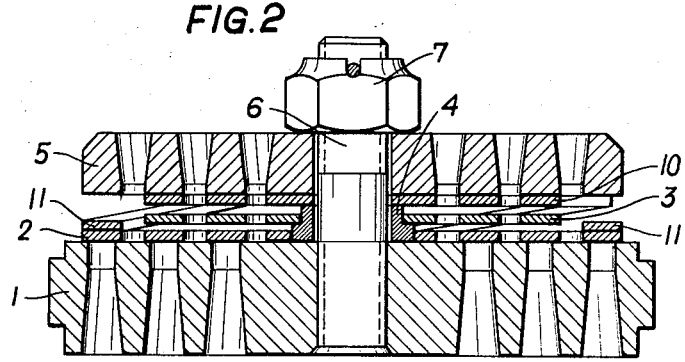
FIG. 2 shows a plate valve according to another embodiment of the invention.

The valve shown in FIG. 2 is substantially similar to the arrangement in FIG. 1, with one exception that the loading spring of the valve plate 2 consists of a spring plate 10 with spring arms 11 bent out of the plane of the spring plate. The spring plate 10 is retained with its innermost ring serving as a hub between the valve guard 5 and the guide ring 4. The spring arms are formed by the outermost ring of the spring plate and thus are positioned outside the periphery of the damping plate 3. Recesses in the damping plate 3 for the spring arms 11 become thereby unnecessary.

Figure 3:
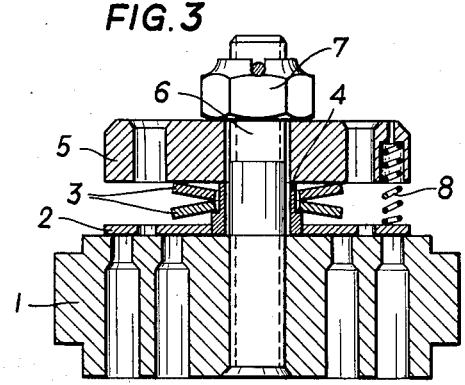
FIG. 3 shows a plate valve according to yet another embodiment of the invention.

In the embodiment according to FIG. 3, two damping plates 3 are provided which are curved in opposite directions and are in contact with each other along their inner margins. In this embodiment too, the damping plates 3 have a substantially smaller outer diameter than the valve plate 2 such that the outermost ring of the valve plate 2 is positioned entirely outside the periphery of the damping plates 3. Because of the dish-shaped form of the damping plates 3, additional springs for these may not be required, as they are held apart by their inherent elasticity from the valve guard when the valve is closed. The reduced outer diameter of the damping plate results in a reduction of the resistance to flow at the outer periphery of the valve in the region of the outermost plate ring of the valve plate 2.

We claim:

1. A plate valve including a valve seat, a valve guard, and a spring loaded valve plate consisting of an outer ring and at least one inner ring, the rings being connected by radial webs and the valve plate being interposed between the valve seat and the valve guard wherein at least one damping plate is provided between the valve plate and the valve guard, the outer diameter of the damping plate being smaller than the outer diameter of the valve plate and a radially outer zone of the damping plate being positioned over an inner ring of the valve plate, and including means for holding the damping plate freely spaced at a distance both from the valve plate and the valve guard when the valve is closed.

2. A plate valve according to claim 1, wherein the valve plate has a plurality of inner rings and the damping plate has a radial zone over each of said inner rings.

3. A plate valve according to claim 1, wherein spring means for the valve plate are positioned radially outwardly of the outer periphery of the damping plate.

4. A plate valve according to claim 3, wherein said spring means are coil springs.

5. A plate valve according to claim 3, wherein said spring means are spring arms of a spring plate.

6. A plate valve according to claim 1, wherein the damping plate is dish-shaped.

* * * * *